United States Patent
Nedez et al.

(10) Patent No.: US 6,656,363 B1
(45) Date of Patent: *Dec. 2, 2003

(54) METHOD FOR ELIMINATING ORGANOPHOSPHORUS COMPOUNDS CONTAINED IN A GAS OR LIQUID

(75) Inventors: Christophe Nedez, Salindres (FR); Dominique Laucher, Ensisheim (FR)

(73) Assignee: Rhodia Chimie, Courbevoie Cedex (FR)

(*) Notice: Subject to any disclaimer, the term of this patent is extended or adjusted under 35 U.S.C. 154(b) by 0 days.

This patent is subject to a terminal disclaimer.

(21) Appl. No.: 09/463,323

(22) PCT Filed: Jul. 17, 1998

(86) PCT No.: PCT/FR98/01569

§ 371 (c)(1),
(2), (4) Date: May 16, 2000

(87) PCT Pub. No.: WO99/04878

PCT Pub. Date: Feb. 4, 1999

(30) Foreign Application Priority Data

Jul. 24, 1997 (FR) .............................. 97 09499

(51) Int. Cl.$^7$ .............................. B01D 15/00
(52) U.S. Cl. .............. 210/660; 210/690; 210/691; 210/906; 588/244
(58) Field of Search ................. 588/244, 246; 423/245.1, 210; 210/906, 660, 690, 691; 558/363

(56) References Cited

U.S. PATENT DOCUMENTS

| | | | | |
|---|---|---|---|---|
| 2,875,847 A | * | 3/1959 | Pring ...................... | 183/114.2 |
| 3,697,233 A | * | 10/1972 | Peck ....................... | 23/293 R |
| 4,089,890 A | * | 5/1978 | Jennings et al. ..... | 260/465.8 D |
| 4,842,746 A | * | 6/1989 | Fowler et al. ............. | 210/689 |
| 4,952,541 A | * | 8/1990 | Heckle et al. ............... | 502/22 |
| 5,008,224 A | * | 4/1991 | Watanabe et al. ............ | 502/63 |
| 5,271,848 A | * | 12/1993 | Smith et al. ............... | 210/702 |
| 5,518,631 A | * | 5/1996 | Maeda ..................... | 210/702 |
| 5,689,038 A | * | 11/1997 | Bartram et al. ............. | 588/200 |
| 5,707,442 A | * | 1/1998 | Fogel et al. ............... | 106/629 |
| 6,174,480 B1 | * | 1/2001 | Nedez ..................... | 264/176.1 |

FOREIGN PATENT DOCUMENTS

| | | | |
|---|---|---|---|
| DE | 2221031 | * | 11/1973 |
| WO | WO 97/12672 | * | 4/1997 |

OTHER PUBLICATIONS

Lu et al. "Adsorption Characteristics of Dichlorvos . . . " Wat. Res. vol. 30 No. 7 pp. 1670–1676, 1996.*
Chemical Abstract No. 22919; vol. 127; No. 2 for JP 09–085,087A, Jul. 14, 1997.*
Chemical Abstract No. 116,690; vol. 109, No. 14 for Kamata et al. "Study on Adsorbed Species . . . ", Oct. 3, 1988.*
Chemical Abstract No. 158,000; vol. 113, No. 18 for Graatzel et al. "Decomposition of Organophosphorus . . . ", Oct. 29, 1990.*

* cited by examiner

Primary Examiner—Stanley S. Silverman
Assistant Examiner—Timothy C. Vanoy
(74) Attorney, Agent, or Firm—Burns, Doane, Swecker & Mathis, L.L.P.

(57) ABSTRACT

The invention concerns a method for eliminating organophosphorus compounds contained in a gas or liquid whereby said gas or liquid is contacted with alumina and/or titanium oxide. According to one aspect of the present invention, a process is provided for disposing of a trivalent and/or pentavalent organophosphorus compound which comprises at least one carbon atom and is contained in a liquid. The process comprises contacting the liquid with titanium oxide and/or alumina, the alumina having a specific surface of at least 70 $m^2/g$ and a total pore volume of at least 0.3 $cm^3/g$. The alumina and/or titanium dioxide can be doped with alkaline metals, alkaline-earth metals and/or rare earths. The organophosphorus compound can include phosphines, phosphinites, phosphites, phosphonites, phosphinates and phosphonates. The liquid which is treated can originate from a dimerization reaction of acrylonitrile in the presence of catalysts containing phosphorus, or from a hydrocyanation reaction of butadiene in the presence of catalysts containing phosphorus.

10 Claims, No Drawings

METHOD FOR ELIMINATING ORGANOPHOSPHORUS COMPOUNDS CONTAINED IN A GAS OR LIQUID

The present invention relates to a process for the disposal of organophosphorus compounds contained in an industrial charge.

It is known to use organophosphorus compounds as catalysts, in particular as catalyst ligands. However, during the step in which these catalysts are employed, it is often found that they become partially degraded, with the result that traces of these catalysts are present in the reaction products. This is the case, for example, during the dimerization reaction of acrylonitrile to form 1,4-butenedinitrile, as described in patent U.S. Pat. No. 4,952,541.

Depending on the way in which these products will later be used, it is often preferable to dispose of the catalyst residues which they contain. This is because these residues may, for example, poison and therefore deactivate the catalysts used in later reaction steps.

It may also be recommended to dispose of these residues in such a way that they do not lead to the release of environmentally controlled compounds into the atmosphere or into residual water and/or solvents.

It is also known to use organophosphorus compounds as extracting agents during purification operations involving liquid/liquid extraction: the product to be purified, initially in aqueous solution with the impurities, is transferred into the extracting solvent based on these organophosphorus compounds, while the impurities remain in the aqueous phase. This gives rise to a purified product in the organic phase which is then back-extracted into the aqueous phase. During this back-extraction, some of the organophosphorus-based organic phase can enter the aqueous phase. The product which is obtained, although purified, then contains undesirable organophosphorus traces.

One conventional way of purifying the products consists in distilling the medium containing the phosphorus residues, but an operation of this type is expensive in terms of investment and operation. Furthermore, it is not always possible and, lastly, decomposition of the products to be purified is sometimes found to occur.

In certain cases, an additional liquid/liquid extraction may be carried out, but the solvent enriched with phosphorus compounds then needs to be treated before being discharged or re-used.

It has also been proposed to use ion-exchange resins, such as for example in patent GB-A-2,212,155. These resins have the drawback of being expensive, as well as of exhibiting acidity which may lead to undesired degradation.

In patent U.S. Pat. No. 4,952,541, the phosphorus compounds are disposed of by bringing the reaction medium into contact with an oxidizing agent. However, depending on the nature of the medium to be treated, it may become degraded by the oxidizing agent.

One object of the present invention is therefore to provide a novel process for the disposal of organophosphorus compounds contained in a liquid or gaseous medium.

Another object is to provide a process of this type which does not degrade a liquid or gaseous medium.

To this end, the invention relates to a process for disposing of trivalent and/or pentavalent organophosphorus compounds which comprise at least one carbon atom and are contained in a gas or a liquid, in which the said gas or, liquid is brought into contact with alumina and/or titanium oxide.

The process of the invention therefore consists in bringing the organophosphorus compounds into contact either with alumina or with titanium oxide, or with a mixed compound of alumina and titanium oxide. The reaction involved is an adsorption and/or uptake reaction.

According to a first embodiment, the process employs an adsorbant solely based on alumina.

The invention preferably excludes those processes for the disposal of organophosphorus compounds contained in a gas or liquid with the aid of alumina for which the organophosphorus compounds are phosphites and the gas or liquid is a charge of ethylenically unsaturated monomers, in particular the processes as defined in French patent application No. 97 00623.

The alumina may be in a variety of forms, and may for example be in the form of powders, beads, extrudates, in crushed form or monolith form. If the alumina which is used is in the form of beads, these beads may result from formation by rotary technology or by drop coagulation (referred to as the oil drop method).

The alumina which is used generally has a specific surface of at least 10 $m^2/g$, preferably at least 30 $m^2/g$, even more preferably at least 70 $m^2/g$.

This specific surface is a surface area measured by the BET method. The term surface area measured by the SET method is intended to mean the specific surface determined by the adsorption of nitrogen, in accordance with standard ASTM D 3663-78, drawn up on the basis of the BRUNAUER-EMMETT-TELLER method described in the periodical "The Journal of the American Society", 60, 309 (1938).

This alumina also generally has a total pore volume (TPV) of at least 0.1 $cm^3/g$, preferably at least 0.3 $cm^3/g$, even more preferably at least 0.5. This total pore volume is measured in the following way: the values of the grain density and the absolute density are determined: the grain density (Dg) and absolute density (Da) are measured by the picnometry method, respectively with mercury and helium, the TPV is given by the formula:

$$\frac{1}{Dg} - \frac{1}{Da}.$$

The processes for preparing aluminas having the total pore volume and specific surface characteristics needed for implementing the process according to the invention are known to the person skilled in the art.

As regards the specific surface, this may in particular be controlled by the temperature at which the alumina is calcined (or activated) after it has been formed.

As regards the pore volume, control over it derives essentially from the selection of the initial alumina used to form it, and the operating conditions under which the alumina is formed. The person skilled in the art will know these conditions.

It is possible to use an alumina comprising at least one compound of an element selected from the group comprising the alkaline metals and the alkaline-earth metals, in particular $Na_2O$, but it is preferable for the proportion of this compound to be at most 5% by weight, and preferably at most 2. This is because it has been found that the adsorption may be less efficient when the alumina comprises these alkali or alkaline-earth metals in too high a proportion.

According to a first preferred variant, the alumina is in the form of beads manufactured by rotary technology, or in a crushed form in which the pore volume corresponding to a diameter in excess of 100 Å ($V_{100 Å}$) is at least 0.05 cm$^3$/g, preferably at least 0.2 cm$^3$/g, and even more preferably at least 0.35 cm$^3$/g.

The volume $V_{100 Å}$ is measured by the mercury penetration technique in which Kelving's law is applied.

Formation by rotary technology involves aggregation of alumina carried out by contact and rotation of alumina by itself. Examples of machines which may be used for this purpose include rotary granulators and rotating drum machines.

This type of process makes it possible to obtain beads having controlled dimensions and pore distributions, these dimensions and distributions being in general created during the aggregation step.

The porosity can be created in various ways, for example selection of the particle size distribution of the alumina powder or the aggregation of several alumina powders with different particle size distributions. Another method consists in mixing a so-called pore-forming compound with the alumina powder before or during the aggregation step, this compound disappearing completely as a result of heating and thus creating porosity in the beads.

As examples of pore-forming compounds which may be used, mention may be made of wood flour, charcoal, sulphur, tars, plastics or emulsions of plastics such as polyvinyl chloride, polyvinyl alcohols, naphthalene or the like. The amount of pore-forming compounds added is dictated by the desired pore volume.

The alumina powder used as a starting material can be obtained by conventional processes such as the precipitation or gel process, and the process involving rapid, dehydration of an alumina hydroxide such as the Bayer hydrate (hydrargillite).

The latter alumina is in particular obtained by rapid dehydration of hydrargillite using a stream of hot gases, the temperature at which the gases enter the equipment generally varying from about 400 to about 1200° C., the contact time of the alumina with the hot gases being generally between a fraction of a second and 4–5 seconds; a process of this type for the preparation of alumina powder has in particular been described in patent FR-A-1,108,011. The latter alumina is the preferred one for the invention.

Control over the pore volumes corresponding to a given diameter may also be brought about during this aggregation step by suitably controlling the rate at which the alumina powder and optionally water are introduced, the speed at which the machine is rotated or by the introduction of a shaping initiator.

After this aggregation, the beads which were obtained can be subjected to a variety of operations intended to improve their mechanical strength, for example maturing by keeping them in an atmosphere with controlled humidity level, followed by calcining then impregnating the balls with a solution of one or more acids and a hydrothermal treatment in a confined atmosphere. Finally, the beads are dried and calcined in order to be activated.

According to a second preferred variant, the alumina is in the form of extrudates or beads resulting from a formation process involving drop coagulation, in which the pore volume corresponding to a diameter in excess of 50 Å ($V_{50 Å}$) is at least 0.3 cm$^3$/g, preferably at least 0.4 cm$^3$/g, and even more preferably at least 0.5 cm$^3$/g.

The volume $V_{50 Å}$ is measured by the mercury penetration technique in which Kelvin's law is applied.

Shaping by drop coagulation consists in introducing drops of an aqueous solution based on an aluminium compound into a liquid which is immiscible with water (petroleum, kerosene, etc.) so that the drops form substantially spherical particles, and these particles are coagulated simultaneously with and/or after being shaped into spheroids by a gelling agent. The beads are then recovered then dried and calcined.

Beads of this type may, for example, be prepared according to the process described in patent EP-A-097,539, by the drop coagulation of an aqueous dispersion or suspension of alumina or a solution of a basic aluminium salt in the form of an emulsion consisting of an organic phase, an aqueous phase and a surfactant or emulsifier. The organic phase may, in particular, be a hydrocarbon, and the surfactant or emulsifier is for example GALORYL EM 10®.

These beads may also be prepared according to the process described in patent EP-A-015,801 by mixing at a pH of less than 7.5 an ultra-fine boehmite sol and spheroid alumina particles, then drop coagulation of this mixture as indicated above, and finally drying and calcining.

The alumina may also be in the form of alumina extrudates. These are generally obtained by blending then extruding an alumina-based material, and finally calcining. The nature of the starting material can vary widely: it may result from the rapid partial dehydration of hydrargillite, according to the teaching of application FR-A-1,108,011, or from the precipitation of boehmite, pseudo-boesmite or bayerite alumina or a mixture of these aluminas. During the blending, the alumina may be mixed with additives, in particular pore-forming compounds as defined above.

These extrudates may be in shapes of any kind: solid or hollow cylinders, multilobed, etc.

The activated aluminas SPHERALITE 521, SPHERALITE 569, SPHERALITE 537, SPHERALITE 517 or SPHERALITE 513 marketed by Procatalyse are entirely suitable for implementing the invention.

According to a second embodiment, the process involves an adsorbent solely based on titanium dioxide.

The titanium dioxide used may be in a variety of forms: extrudates with solid or hollow shapes, with cylindrical or multilobed profile crushed form, pellets, granules, monoliths and more particularly in honeycomb form.

It may be formed by any preparation method known to the person skilled in the art. A preferred method is the one described in documents EP-A-038 741 and EP-A-060 741, which consists in extruding a mixture comprising:

from 1 to 40% by weight of water, from 0 to 15% by weight of forming additives as defined above, from 45 to 99% by weight of a weakly crystallised and/or amorphous titanium dioxide powder, exhibiting a loss on ignition of between 1 and 50%, then in shaping this mixture and drying and calcining it.

The titanium dioxide preferably has a BET specific surface of at least 30 m²/g.

Similarly, it is preferable to use a titanium dioxide having a total pore volume of at least 0.2 cm³/g.

The titanium dioxide CRS-31 marketed by Procatalyse is fully suitable for implementing the invention.

Lastly, according to a third embodiment, the process employs an adsorbant which is a mixed compound of alumina and titanium dioxide.

This mixed compound may be obtained either by impregnating alumina with a precursor solution of a titanium compound, then decomposition of this precursor into titanium dioxide by heating, or by blending together alumina and titanium dioxide, or coprecipitating these compounds, then shaping according to one of the methods described above.

When the mixed compound comprises at least 5% by weight of titanium dioxide relative to the total compound, the said compound preferably has a BET specific surface of at least 30 m²/g. Similarly, in the latter case, it is preferable to use a titanium dioxide having a total pore volume of at least 0.2 cm³/g.

Regardless of the embodiment which is used, the alumina and/or titanium dioxide may be doped with at least one of the elements selected from the alkali metals, alkaline-earth metals, the rare earths, vanadium, niobium, tantalum, chromium, molybdenum, tungsten, iron, cobalt, nickel, copper, zinc, ruthenium, palladium, gallium and zirconium. The compounds of these elements which are present in the composition of the adsorbent based on alumina and/or titanium dioxide may represent up to 30% by weight of the total adsorbent.

However, in the case when the adsorbant comprises only alumina, and the dopant element is an alkali or alkaline-earth metal, it is preferable to keep to a maximum proportion of 5% by weight, as indicated above.

It is possible to implement all three embodiments at the same time, that is to say use a mixture of two or three of the cited adsorbants in the process: alumina, titanium dioxide or mixed alumina/titanium dioxide compound.

However, the process employing solely alumina is preferred.

The organophosphorus compounds which can be disposed of according to the process of the invention may be selected from: phosphines, phosphinites, phosphonites, phosphites, phosphinates, phosphonates and phosphates.

They may, in particular, be the following compounds: tert-butyl phenylenetolylphosphite, isopropyl ditolylphosphinite, isopropyl ditolyl-phosphonite, triaryl phosphites, diaryl phosphites, organophosphorus compounds of the phosphonate type, such as for example dibutyl butylphosphonate (DBBP), bis(2-ethylhexyl) phosphonate (DHEHP), tetraethyl butylenediphosphonate: $(C_2H_5O)_2$—OP—$CH_2$—$(CH_2)_2$—$CH_2$—$PO(OC_2H_5)_2$, tetraisopropyl methylmethylenediphosphonate: $(iC_3H_7O)_2OP$—CH($CH_3$)—$PO(iC_3H_7)_2$, tetraethyl decylenediphosphonate: $(C_2H_5O)_2$—OP—$CH_2$—$(CH_2)_8$—$CH_2$—$PO(OC_2H_5)_2$, dipentyl pentylphosphonate (DPPP), diethyl dodecylphosphonate, organophosphorus compounds of the phosphinate type, such as for example dioctyl methylphosphinate, phosphine oxides such as, for example, di-n-hexylmethoxyoctylphosphine (DHMOPO), tri-n-butylphosphine oxide (TBPO) and trioctylphosphine oxide (TOPO).

In general, the process is carried out at room temperature. Heating may, however, be used.

The process according to the invention is suitable, for example, for treating nitrile or dinitrile compounds comprising organophosphorus impurities.

The process of the invention is particularly suitable for treating a liquid originating from the dimerization reaction of acrylonitrile in the presence of catalysts containing phosphorus, or from the hydrocyanation reaction of butadiene in the presence of catalysts containing phosphorus.

Alumina is fully suitable for disposing of these organophosphorus traces from the reaction medium.

The following examples illustrate the invention, but without limiting its scope.

EXAMPLES

Table 1 summarizes the characteristics of the aluminas which are used.

TABLE 1

| Alumina | Shaping | Specific surface (m²/g) | $V_{50 Å}$ (cm³/g) | $V_{100 Å}$ (cm³/g) | $Na_2O$ rate (ppm) |
|---|---|---|---|---|---|
| A | balls | 325 | 0.165 | 0.064 | 3250 |
| B | balls | 185 | 0.548 | 0.381 | 600 |
| C | balls | 208 | 0.904 | 0.706 | 690 |
| D | balls | 145 | 1.073 | 0.974 | 500 |
| E | extrudates | 211 | 0.621 | 0.380 | 10 |
| F | balls | 252 | 0.201 | 0.071 | 20,000 |

Example 1

Ditolyl phosphite ($(tolO)_2POH$) is dissolved in a beaker in 20 g of 1,4-dicyanobutene to a concentration by mass of 750 ppm, expressed in terms of the element phosphorus.

1 g of alumina is placed in a glass tripod boat then is treated for 2 hours at 300° C. under a dry nitrogen stream. The boat is then immersed in the beaker of ditolyl phosphite and 1,4-dicyanobutene without the alumina being brought into contact with ambient air, in order to avoid undesired rehydration.

The beaker is allowed to stand while being stirred at room temperature for a time of between 2 and 96 hours.

As a function of the contact time between the alumina and the medium, the proportion of phosphorus still present in the solution is determined so as to estimate the progress of the reaction by which the phosphorus compounds are adsorbed by the alumina. The phosphorus at the surface of the alumina is also determined, once the alumina has been drained. The two determination methods are in agreement.

For each alumina, and as a function of the reaction time, Table 2 gives the percentage of phosphorus compounds taken up by the alumina.

TABLE 2

| Time (h) | Alumina | | | | | |
|---|---|---|---|---|---|---|
| | A | B | C | D | E | F |
| 0 | 0% | 0% | 0% | 0% | 0% | 0% |
| 2 | 10.6% | 19.0% | 27.6% | 30.2% | 29.5% | 10.1% |
| 5 | 22.4% | 32.6% | 51.1% | 54.1% | 53.6% | 20.4% |
| 8 | 26.1% | 52.4% | 63.2% | 69.9% | 69.7% | 24.0% |
| 24 | 46.5% | 76.5% | 87.0% | 87.5% | 67.8% | 42.1% |
| 48 | 56.1% | 87.8% | 97.5% | 97.4% | 97.2% | 51.1% |
| 72 | 64.4% | 93.2% | 98.8% | 99.0% | 99.4% | 59.6% |
| 96 | 73.1% | 95.7% | 100% | 100% | 100% | 66.2% |

Example 2

The procedure in Example 1 is repeated on a solution of 200 g of adiponitrile comprising 730 ppm by mass of ditolylphosphinite expressed in terms of the elements phosphorus. 9.2 g of alumina C are used.

The results are collated in Table 3.

TABLE 3

| Time (h) | % adsorption |
|---|---|
| 0 | 0 |
| 6 | 56.7 |
| 36 | 94.1 |
| 84 | 99.8 |

Example 4

The procedure in Example 1 is repeated on a solution of 30 ml of toluene comprising 800 ppm by mass of a diphosphorus pentavalent compound ($(PhO)_2P(O)OH$) expressed in terms of the element phosphorus. 1.4 g of alumina D are used.

The results are collated in Table 4.

TABLE 4

| Time (h) | % adsorption |
|---|---|
| 0 | 0 |
| 3 | 41.2 |
| 6 | 61.0 |
| 9 | 73.9 |

What is claimed is:

1. A process for disposing of a trivalent and/or pentavalent organophorus compound having at least one carbon atom, comprising:
adsorbing the trivalent and/or pentavalent organophosphorus compound onto an alumina and/or titanium dioxide by contacting a liquid containing the trivalent and/or pentavalent organophosphorus compound with a material comprising the alumina and/or titanium dioxide, wherein the liquid further comprises a nitrile and/or dinitrile.

2. The process according to claim 1, wherein the alumina has a specific surface of at least 70 $m^2/g$.

3. The process according to claim 1, wherein the alumina has a pore volume of at least 0.5 $cm^3/g$.

4. The process according to claim 1, wherein the material further comprises at least one compound of an element selected from the group consisting of an alkali metal and an alkaline-earth metal, in an amount of at most 2% by weight.

5. The process according to claim 1, wherein the material is in the form of beads manufactured by rotary technology, or in a crushed form in which the pore volume corresponding to a diameter in excess of 100 Å is at least 0.35 $cm^3/g$.

6. The process according to claim 1, wherein the material is in the form of extrudates or beads resulting from a drop coagulation process, in which the pore volume corresponding to a diameter in excess of 50 Å is at least 0.5 $cm^3/g$.

7. The process according to claim 1, wherein the alumina and/or titanium dioxide is doped with at least one of the elements selected from the group consisting of an alkali metal, alkaline-earth metal, rare-earth, vanadium, niobium, tantalum, chromium, molybdenum, tungsten, iron, cobalt, nickel, copper, zinc, ruthenium, palladium, gallium and zirconium.

8. The process according to claim 1, wherein the trivalent and/or pentavalent organophosphorus compound is selected from the group consisting of a phosphine, phosphinite, phosphite, phosphonite, phosphinate and phosphonate.

9. The process according to claim 8, wherein the trivalent and/or pentavalent organophosphorus compound is selected from the group consisting of tert-butyl phenylenetolylphosphite, isopropyl ditolylphosphinite, isopropyl ditolylphosphonite, a triaryl phosphite and a diaryl phosphite.

10. The process according to claim 1, wherein the liquid originates from a dimerization reaction of acrylonitrile in the presence of a catalyst containing phosphorus, or from a hydrocyanation reaction of butadiene in the presence of a catalyst containing phosphorus.

* * * * *